(12) United States Patent
Choi et al.

(10) Patent No.: US 11,706,032 B2
(45) Date of Patent: Jul. 18, 2023

(54) METHOD AND APPARATUS FOR USER AUTHENTICATION

(71) Applicant: SAMSUNG SDS CO., LTD., Seoul (KR)

(72) Inventors: Kyu-Young Choi, Seoul (KR); Hee-Jin Park, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 198 days.

(21) Appl. No.: 16/664,827

(22) Filed: Oct. 26, 2019

(65) Prior Publication Data

US 2021/0105139 A1  Apr. 8, 2021

(30) Foreign Application Priority Data

Oct. 2, 2019  (KR) .................. 10-2019-0122333

(51) Int. Cl.
*H04L 29/06* (2006.01)
*H04L 9/32* (2006.01)
*H04L 9/30* (2006.01)
*H04L 9/08* (2006.01)

(52) U.S. Cl.
CPC .......... *H04L 9/3231* (2013.01); *H04L 9/0869* (2013.01); *H04L 9/30* (2013.01); *H04L 9/3247* (2013.01); *H04L 9/3271* (2013.01)

(58) Field of Classification Search
CPC ....... H04L 9/3231; H04L 9/30; H04L 9/3247; H04L 9/3271; H04L 9/0869
See application file for complete search history.

(56) References Cited

U.S. PATENT DOCUMENTS

| | | | |
|---|---|---|---|
| 2011/0179286 A1* | 7/2011 | Spalka | G06F 21/6254 713/189 |
| 2011/0191837 A1* | 8/2011 | Guajardo Merchan | H04L 9/3278 726/6 |
| 2012/0033807 A1* | 2/2012 | Asim | G06F 21/6254 380/44 |
| 2015/0318994 A1* | 11/2015 | Walsh | G06F 21/32 713/182 |
| 2016/0269393 A1* | 9/2016 | Corella | G06F 21/33 |
| 2017/0149572 A1* | 5/2017 | Wallrabenstein | H03K 19/17748 |
| 2017/0244568 A1* | 8/2017 | Brickell | H04L 63/0823 |
| 2018/0041505 A1* | 2/2018 | Chabanne | G06F 21/32 |
| 2018/0241558 A1* | 8/2018 | Takahashi | H04L 9/3231 |
| 2018/0351753 A1* | 12/2018 | Gardner | H04L 9/3218 |
| 2019/0020472 A1* | 1/2019 | Cho | H04L 9/3231 |

FOREIGN PATENT DOCUMENTS

KR  10-2018-0069669 A  6/2018

* cited by examiner

*Primary Examiner* — Joseph P Hirl
*Assistant Examiner* — Leynna Truvan
(74) *Attorney, Agent, or Firm* — The PL Law Group, PLLC

(57) ABSTRACT

A method for user authentication according to one embodiment of the present disclosure includes acquiring authentication information including biometric information of a user, generating a random string and a helper string from the biometric information, generating a secret value that corresponds to the authentication information, generating a private key and a public key using the secret value and the random string, and transmitting the public key to an authentication server.

4 Claims, 4 Drawing Sheets

METHOD AND APPARATUS FOR USER AUTHENTICATION

CROSS REFERENCE TO RELATED APPLICATIONS AND CLAIM OF PRIORITY

This application claims the benefit of Korean Patent Application No. 10-2019-0122333 filed on Oct. 2, 2019 in the Korean Intellectual Property Office, the disclosure of which is incorporated herein by reference in its entirety.

TECHNICAL FIELD

The following description relates to user authentication technology.

BACKGROUND ART

Fast IDentity Online (FIDO) technology, which is widely known as a standard for biometric authentication, is known to deliver strong security through biometric authentication. However, for user verification, a server validates only a signature so that authentication is completed with only single-factor authentication. Such single-factor authentication has a problem in that security may be broken once a single piece of secret information of a user, i.e., a signature key inside a terminal in the case of FIDO, is exposed.

SUMMARY

The disclosed embodiments are intended to provide a method and apparatus for user authentication.

In one general aspect, there is provided A method of user authentication which is performed by a computing device comprising one or more processors and a memory storing one or more programs to be executed by the one or more processors, the method including acquiring authentication information including biometric information of a user; generating a random string and a helper string from the biometric information; generating a secret value that corresponds to the authentication information; generating a private key and a public key using the secret value and the random string; and transmitting the public key to an authentication server.

The method may further include deleting the private key and the random string and storing the secret value and the helper string.

In another general aspect, there is provided a method of user authentication which is performed by a computing device comprising one or more processors and a memory storing one or more programs to be executed by the one or more programs, the method including receiving a challenge value from an authentication server; acquiring first biometric information of a user; generating a first random string using the first biometric information and a pre-generated helper string; performing authentication of the first biometric information; when the authentication is successful, generating a private key using the first random string and a pre-generated secret value that corresponds to the first biometric information; generating a digital signature for the challenge value using the private key; and transmitting the digital signature to the authentication server.

The authentication server may store a public key of the user, which is previously generated using the secret value and a second random string generated from second biometric information of the user that is used when the helper string is generated.

The method may further include receiving, from the authentication server, an authentication result based on a result of verifying the digital signature using the public key.

In still another general aspect, there is provided an apparatus for user authentication comprising one or more processors and a memory storing one or more programs to be executed by the one or more processors, wherein the one or more programs comprise commands for acquiring authentication information including biometric information of a user, generating a random string and a helper string from the biometric information, generating a secret value that corresponds to the authentication information, generating a private key and a public key using the secret value and the random string, and transmitting the public key to an authentication server.

The one or more programs may further include commands for deleting the private key and the random string and storing the secret value and the helper string.

In yet another general aspect, there is provided an apparatus for user authentication comprising one or more processors and a memory storing one or more programs to be executed by the one or more processors, wherein the one or more programs comprise commands for receiving a challenge value from an authentication server, acquiring first biometric information of a user, generating a first random string using the first biometric information and a pre-generated helper string, performing authentication of the first biometric information, when the authentication is successful, generating a private key using the first random string and a pre-generated secret value that corresponds to the first biometric information, generating a digital signature for the challenge value using the private key, and transmitting the digital signature to the authentication server.

The authentication server may store a public key of the user, which is previously generated using the secret value and a second random string generated from second biometric information of the user that is used when the helper string is generated.

The one or more programs may further include commands for receiving, from the authentication server, an authentication result based on a result of verifying the digital signature using the public key.

According to the embodiments of the present disclosure, a private key and a public key are generated using a secret value generated through authentication of biometric information of a user and a random string generated from the biometric information and user authentication is performed using the generated private key and public key, which enables 2-factor authentication in accordance with the universal authentication framework (UAF) protocol from FIDO.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

Figure 1:
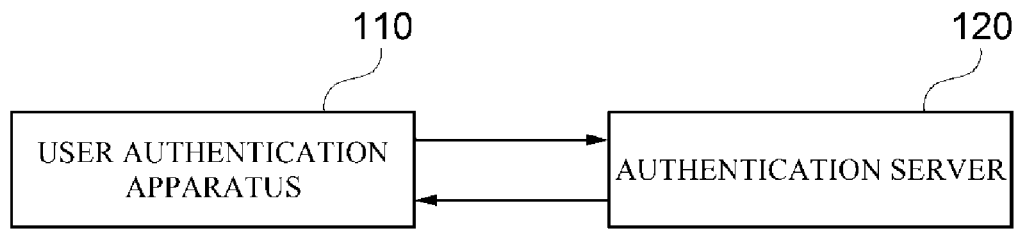
FIG. 1 is a diagram illustrating a configuration of an authentication system according to one embodiment of the present disclosure.

FIG. 1 is a diagram illustrating a configuration of an authentication system according to one embodiment of the present disclosure.

Referring to FIG. 1, the authentication system 100 according to one embodiment of the present disclosure includes a user authentication apparatus 110 and an authentication server 120.

The user authentication apparatus 110 is an apparatus used for user authentication using biometric information. The user authentication apparatus 110 may be various types of computing devices including a means for acquiring biometric information and a means for communication through a wired and/or wireless network, or be one configuration included in the computing device, such as a desktop personal computer (PC), a notebook PC, a tablet PC, a smartphone, a personal digital assistant (PDA), a smartwatch, and the like. However, the user authentication apparatus 110 is not necessarily limited to a particular type of device.

The authentication server 120 is a server that stores a public key of a user, which is generated by the user authentication apparatus 110, according to a request for public key registration from the user authentication apparatus 110 and performs user authentication using the stored public key upon a request for user authentication from the user authentication apparatus 110.

According to one embodiment of the present disclosure, the user authentication apparatus 110 may generate a private key-public key pair of the user using biometric information of the user, register the public key as authentication information in the authentication server 120, and delete the private key.

When user authentication is required, the user authentication apparatus 110 may acquire the biometric information of the user and then generate the private key of the user using the acquired biometric information. Then, the user authentication apparatus 110 may generate digital signature using the generated private key and provide the generated digital signature to the authentication server 120 to request user authentication. In this case, the authentication server 120 may perform user authentication by verifying the digital signature received from the user authentication apparatus 110 using the public key of the user stored in the authentication server 120.

According to one embodiment of the present disclosure, public key registration and user authentication, which are performed between the user authentication apparatus 110 and the authentication server 120, may be performed according to procedures defined by, for example, the universal authentication framework (UAF) protocol of Fast IDentity Online (FIDO).

Figure 2:
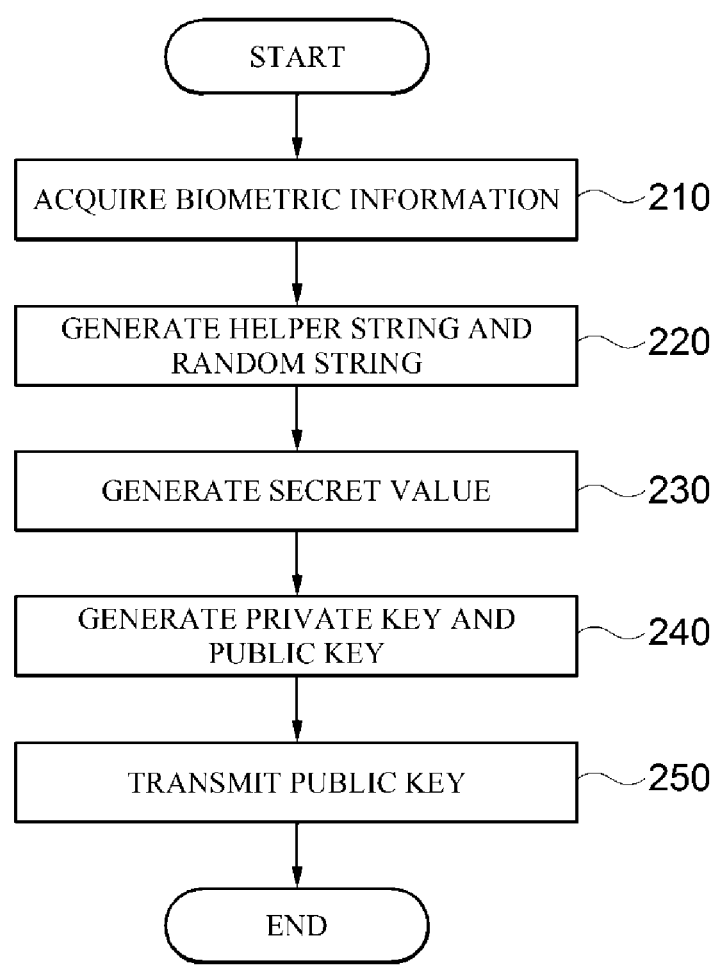
FIG. 2 is a flowchart illustrating a process of registering authentication information according to one embodiment of the present disclosure.

FIG. 2 is a flowchart illustrating a process of registering authentication information according to one embodiment of the present disclosure.

Each of the operations illustrated in FIG. 2 may be performed by the user authentication apparatus 110.

Referring to FIG. 2, the user authentication apparatus 110 acquires biometric information of a user (210).

In this case, the biometric information may refer to information that can be directly or indirectly acquired from the body of the user, such as fingerprints, irises, retinas, veins, voice, a face, and the like, and is related to the user's unique physical and behavioral characteristics that can be used for personal identification.

Specifically, the biometric information may be data obtained by, for example, extracting features from the user's physical and behavioral characteristics and encoding the features. To this end, the user authentication apparatus 110 may include a means for acquiring the user's physical and behavioral characteristics in the form of an image, voice, and the like, for example, a microphone, a camera, a fingerprint sensor, and the like, and a means for extracting features from the acquired characteristics and encoding the features.

According to one embodiment, the user authentication apparatus 110 may acquire additional information, such as personal identification number (PIN), password, and the like, which can be used for user authentication, together with the biometric information. In this case, the additional information may be acquired through an input means included in the user authentication apparatus 110, for example, a keyboard, a touchscreen, and the like.

Then, the user authentication apparatus 110 generates a helper string and a random string from the acquired biometric information of the user (220).

In this case, according to one embodiment of the present disclosure, the user authentication apparatus 110 may generate the helper string and the random string based on a user authentication technique based on well-known fuzzy extraction.

Specifically, the user authentication technique based on fuzzy extraction may include the generate algorithm (i.e., $Gen(x)=(R,P)$) in which biometric information x is received as an input and random string R and helper string P are output and the restore algorithm (i.e., $Rep((x', P)=R')$) in which biometric information x' and helper string P are received as inputs and random string R' (here, when a distance between w and w' is less than or equal to a threshold, R'=R is satisfied) is output. The user authentication apparatus 110 may generate a helper string and a random string using the generate algorithm of the user authentication technique based on fuzzy extraction.

Then, the user authentication apparatus 110 generates a secret value that corresponds to the acquired biometric information (230).

In this case, according to one embodiment of the present disclosure, the secret value may be randomly generated or be selected from among values in a predetermined range, but a method of generating a secret value is not necessarily limited to a particular method.

Then, the user authentication apparatus 110 generates a private key and a public key of the user using the generated secret value and random string (240).

In this case, the user authentication apparatus 110 may generate the private key through, for example, an exclusive OR (XOR) between the generated secret key and the random string and generate the public key using the generated private key.

However, if in an asymmetric key-based algorithm, such as digital signature algorithm (DSA), elliptic curve digital signature algorithm (ECDSA), Rivest-Shamir-Adleman (RSA) algorithm, or the like, a private key and a public key which can be used for generation of a digital signature and verification of the digital signature can be generated, the method of generating the private key and the public key using a secret value and a random string is not necessarily limited to a particular method.

Then, the user authentication apparatus 110 transmits the generated public key of the user to the authentication server 120 to request registration of the public key (250).

In this case, according to one embodiment, the user authentication apparatus 110 may generate an attestation value, which is defined by FIDO's UAF protocol and transmit the attestation value, together with the public key, to the authentication server 120.

Meanwhile, the authentication server 120, which receives the public key of the user from the user authentication apparatus 110, may store the received public key therein and then transmit a registration result of the public key to the user authentication apparatus 110.

Also, according to one embodiment of the present disclosure, the user authentication apparatus 110 may delete the private key and the random string and store the secret key and the helper string after transmitting the public key to the authentication server 120. At this time, the secret value may be stored in a secure area in the user authentication apparatus 110, for example, trusted execution environment (TEE), secure element (SE), or the like.

Although the user authentication apparatus 110 is described as generating the secret value that corresponds to the biometric information in operation 230 in the embodiment shown in FIG. 2, the user authentication apparatus 110 may generate a secret value that corresponds to the additional information acquired together with the biometric information according to an embodiment.

Figure 3:
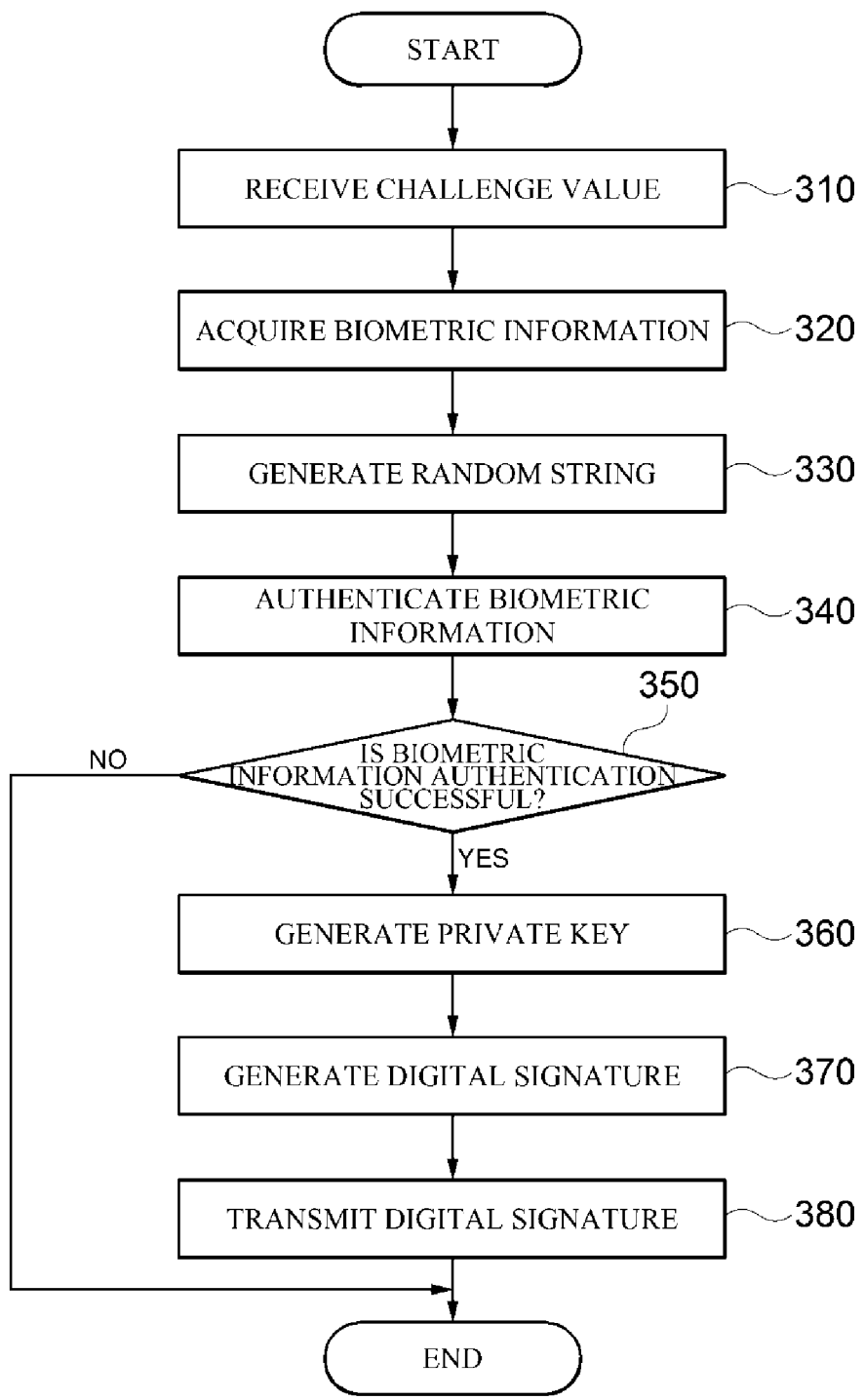
FIG. 3 is a flowchart illustrating a process of user authentication according to one embodiment of the present disclosure.

FIG. 3 is a flowchart illustrating a process of user authentication according to one embodiment of the present disclosure.

Each of the operations illustrated in FIG. 3 may be performed by the user authentication apparatus 110 after a public key of the user is registered in the authentication server 120 through the process of registering authentication information shown in FIG. 2.

Referring to FIG. 3, the user authentication apparatus 110 receives a challenge value from the authentication server 120 (310).

At this time, the challenge value may be a value randomly generated by the authentication server 120. Specifically, the user authentication apparatus 110 may request the authentication server 120 for user authentication, if necessary. In this case, the authentication server 120 may generate a challenge value in response to the request for user authentication and provide the challenge value to the user authentication apparatus 110.

Then, the user authentication apparatus 10 acquires biometric information of the user (320).

At this time, according to one embodiment, the user authentication apparatus may acquire additional information, such as PIN, password, and the like, which can be used for user authentication, together with the biometric information. In this case, the additional information may be acquired through an input means included in the user authentication apparatus 110, for example, a keyboard, a touchscreen, and the like.

Then, the user authentication apparatus 110 generates a random string using the acquired biometric information and previously generated helper string (330).

The helper string may be a string that is generated in operation 220 in FIG. 2 and stored in the user authentication apparatus 110.

In addition, according to one embodiment, the user authentication apparatus 110 may generate the random string using the restore algorithm of the above-described user authentication technique based on fuzzy extraction.

Then, the user authentication apparatus 110 performs authentication of the acquired biometric information (340).

Specifically, according to one embodiment, the user authentication apparatus 110 may perform authentication of the acquired biometric information by comparing the acquired biometric information and biometric information previously registered in the user authentication apparatus 110. At this time, the previously registered biometric information may be stored in a secure area of the user authentication apparatus, for example, TEE, SE, or the like.

When a comparison result indicates that the previously registered biometric information and the acquired biometric information match within a predetermined error range, the user authentication apparatus 110 determines that the authentication of the acquired biometric information is successful. However, the authentication of the acquired biometric information may be performed in various ways according to the type of the acquired biometric information, and may be performed using various known methods, in addition to the above-described example.

According to an embodiment, the user authentication apparatus 110 may perform authentication of the additional information acquired together with the biometric information. In this case, the user authentication apparatus 110 may compare the acquired additional information and pre-registered information, and when they match each other, may determine that the authentication is successful.

When the authentication of the acquired biometric information is successful, the user authentication apparatus 110 generates a private key using the generated random string and a pre-stored secret value (350 and 360).

In this case, the pre-stored secret value may be a value that is generated in operation 230 in FIG. 2 and stored in a secure area of the user authentication apparatus 110.

Also, the user authentication apparatus 110 may generate the private key using the same method as used for generating the private key in operation 240 in FIG. 2.

Thereafter, the user authentication apparatus 110 generate a digital signature for the challenge value using the generated private key (370).

In this case, the user authentication apparatus 110 may generate the digital signature using an asymmetric key-based digital signature algorithm, such as DSA, ECDSA, RSA, or the like.

Then, the user authentication apparatus 110 transmits the generated digital signature to the authentication server 120 to request user authentication (380).

Meanwhile, the authentication server 120 which receives the digital signature from the user authentication apparatus 110 may verify the received digital signature using a pre-registered public key of the user and transmit a user authentication result based on a verification result to the user authentication apparatus 110. In this case, the pre-registered public key of the user may be generated and registered through the process shown in FIG. 2. The verification of the digital signature may be performed using an asymmetric key-based digital signature algorithm, such as DSA, ECDSA, RSA, or the like.

Although in the flowcharts illustrated in FIGS. 2 and 3, the procedure is described as being divided into a plurality of operations, at least some of the operations may be performed in different order or may be combined into fewer operations or further divided into more operations. In addition, some of the operations may be omitted, or one or more extra operations, which are not illustrated, may be added to the flowchart and be performed.

Figure 4:
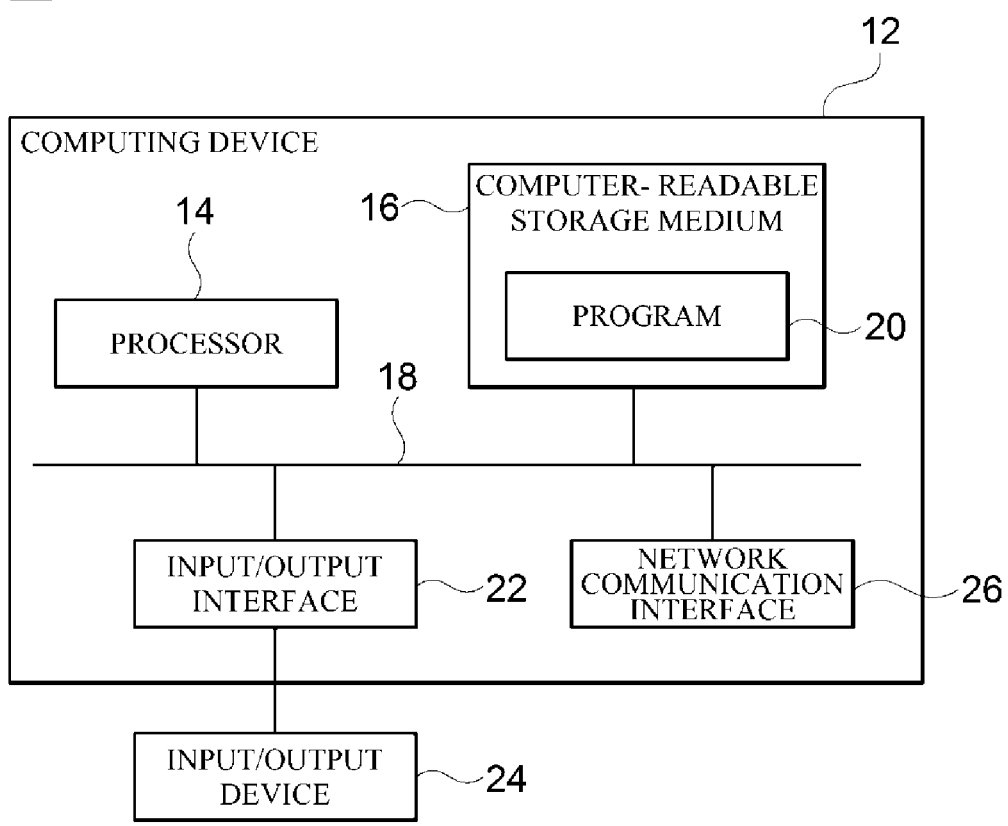
FIG. 4 is a block diagram for describing a computing environment including a computing device suitable to use in exemplary embodiments.

FIG. 4 is a block diagram for describing a computing environment including a computing device suitable to use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in the user authentication apparatus 110.

The computing device 12 may include at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable commands, and the computer executable commands may be configured to, when executed by the processor 14, cause the computing device 12 to perform operations according to the exemplary embodiment.

The computer-readable storage medium 16 is configured to store computer executable commands and program codes, program data and/or information in other suitable forms. The program 20 stored in the computer-readable storage medium 16 may include a set of commands executable by the processor 14. In one embodiment, the computer-readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer-readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24, which is one component constituting the computing device 12, may be included inside the computing device 12 or may be configured as a device separate from the computing device 12 and be connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of user authentication which is performed by a computing device comprising one or more processors and a memory storing one or more programs to be executed by the one or more processors, the method comprising:
   acquiring biometric information of a user;
   generating a random string and a helper string from the biometric information using a generate algorithm of a user authentication technique based on fuzzy extraction;
   generating a secret value that corresponds to the biometric information;
   generating a private key and a public key using the secret value and the random string, wherein the private key is generated through an exclusive OR between the secret key and the random string, and the public key is used for verification of a digital signature;
   transmitting the public key to an authentication server; and
   storing the secret value and the helper string,
   wherein the transmitting of the public key comprises:
      generating an attestation value defined by Fast Identity Online (FIDO) Universal Authentication Framework (UAF) protocol; and
      transmitting the attestation value, together with the public key, to the authentication server, to enable 2-factor authentication in accordance with the UAF protocol from the FIDO.

2. The method of claim 1, further comprising:
   deleting the private key and the random string.

3. An apparatus for user authentication, the apparatus comprising:
   one or more processors; and
   a memory storing one or more programs to be executed by the one or more processors,
   wherein the one or more programs comprise:
      a command for acquiring biometric information of a user;
      a command for generating a random string and a helper string from the biometric information using a generate algorithm of a user authentication technique based on fuzzy extraction;
      a command for generating a secret value that corresponds to the biometric information;
      a command for generating a private key and a public key using the secret value and the random string, wherein the private key is generated through an exclusive OR between the secret key and the random string, and the public key is used for verification of a digital signature;

a command for transmitting the public key to an authentication server; and a command for storing the secret value and the helper string, wherein the command for transmitting the public key to the authentication server comprises:

generating an attestation value defined by Fast Identity Online (FIDO) Universal Authentication Framework (UAF) protocol; and transmitting the attestation value, together with the public key, to the authentication server to enable 2-factor authentication in accordance with the UAF protocol from the FIDO.

4. The apparatus of claim 3, wherein the one or more programs further comprise:

a command for deleting the private key and the random string.

* * * * *